Aug. 8, 1944.  T. J. PETHES, JR  2,355,237
ELECTROMAGNETIC DEVICE
Filed Sept. 9, 1942
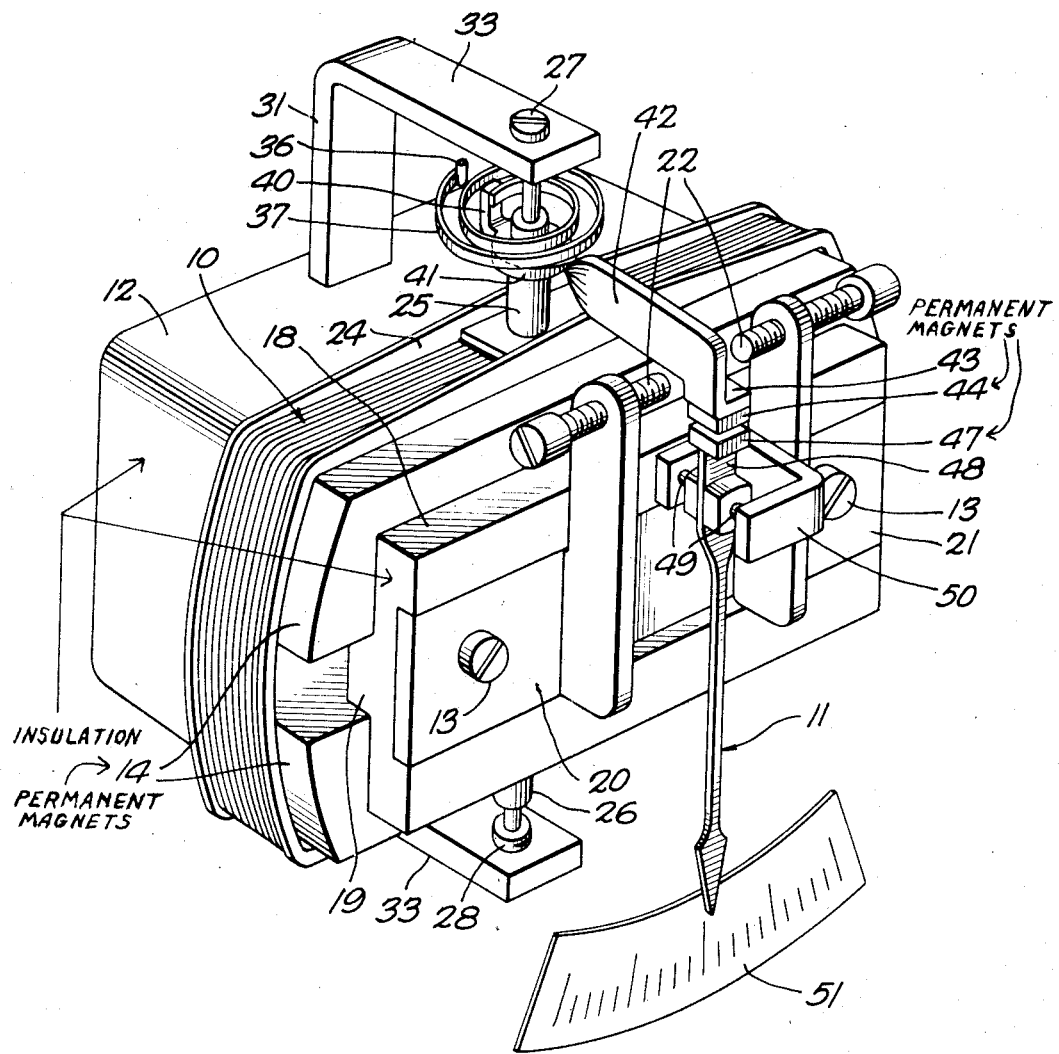
INVENTOR.
T. J. PETHES, JR.
BY
Harry L. Duff
ATTORNEY Patented Aug. 8, 1944

2,355,237

UNITED STATES PATENT OFFICE 2,355,237

ELECTROMAGNETIC DEVICE

Theodore J. Pethes, Jr., Elmwood Park, Ill., assignor to Western Electric Company, Incorporated, New York, N. Y., a corporation of New York Application September 9, 1942, Serial No. 457,707

5 Claims. (Cl. 171—95)

This invention relates to electromagnetic devices, and particularly to the coupling of indicators to their source of motion for use in meter type relays of the general type disclosed in the patent to L. E. Lawrence, No. 1,927,346 of September 19, 1933.

In the manufacture of the above type of relay, the practice has been to couple an indicator to a rotatable coil, which is arranged in the field of a permanent magnet, so that it will rotate in the plane of rotation of the coil. At times, it is desirable or necessary that the rotation of the indicator be at an angle to the plane of rotation of the coil. This last mentioned motion of the indicator may be controlled and produced by means of a mechanical coupling between the indicator and the coil, but due to frictional losses encountered between the coil and the indicator, such a coupling is not very efficient.

An object of the present invention is to provide a practical and efficient arrangement for coupling a rotatable coil of a meter type relay to an indicator which is to be rotated thereby at an angle to the plane of rotation of the coil.

In accordance with one embodiment of the invention as applied to a meter type relay, a contact element movable with the rotatable coil carries a small permanent magnet which in the movement of the coil, when a circuit through the coil is closed, produces a corresponding movement in a pivotal indicator or pointer having a similar magnet attached thereto. The arrangement produces a magnetic coupling which results in a minimum of friction losses between the rotatable coil and the indicator, the two magnets being of opposite poles. Associated with the indicator is a scale, whereby the deflection of the indicator may be read.

A complete understanding of the invention may be had by reference to the following specification, taken in conjunction with the accompanying drawing, in which the single figure is a perspective view of a meter type relay embodying the invention.

Referring now in detail to the drawing, there is illustrated an embodiment of the invention as applied to a direct current meter type relay of the general type disclosed in the referred to Patent No. 1,927,346, to which reference may be had for a more detailed disclosure of such a relay and its application. In this figure, only such parts are shown which are necessary to a full understanding of the magnetic coupling embodying the features of this invention as arranged between a rotatable armature or coil, indicated at 10, and a pivotal indicator or pointer 11.

The parts of the relay which are shown in the drawing are mounted on a base 12 of suitable insulating material. Secured to the base 12 by a pair of bolts 13 are spaced bar magnets 14, which engage at their inner longitudinal faces on depressed spaced faces of the base 12. The magnets may be made of cobalt steel or other suitable permanent magnet material having a high remanence and high coercive force. Engaging the outer longitudinal faces of the magnets 14 is a channel-shaped strip 18 of a suitable insulating material having, upon its rear face, an aligning rib 19 which extends into the space between the magnets 14. The strip 18, magnets 14, and a pair of spaced angularly formed terminal or contact supports 20 and 21 are secured to the base 12 by the previously mentioned bolts 13. Each of the terminal supports 20 and 21 has an adjustable contact screw 22.

The bar magnets 14 are provided with arcuate ends forming a composite arc about the center of curvature of a field core (not shown) at a shorter radius than the inner periphery of the field core to provide an air gap for the rotatable armature or coil 10. This coil consists of a plurality of convolutions of wire wound upon a channel-shaped frame 24 of aluminum or other suitable material, which freely surrounds the bar magnets 14. Adhesively secured to opposite longitudinal sides of the coil 10 is a pair of studs 25 and 26, which carry pivot points adapted to be journalled in jewel bearings (not shown) carried by screws 27 and 28, respectively. Imbedded in the base 12 and extending from opposite longitudinal sides thereof are standards 31, only one of which is illustrated, which are formed with right-angularly extending arms 33 in which the screws 27 and 28 are suitably secured. Carried by a rotary adjustable support (not shown) mounted on the upper arm 33 is a pin 36, shown fragmentarily, which is attached to an outer end of a spiral spring 37, the inner end of which is attached to a projection 40 of a washer 41, which is suitably attached to the stud 25 of the rotatable coil 10. Also attached to the stud 25 with the washer 41 is a pointer or contact arm 42, which extends laterally from and at right angles to and in alignment with the longitudinal axis of the stud 25 and into the space between the opposed ends of the contact screws 22, the screws limiting the movement of the arm 42 in either direction.

In order to rotate the pivotal pointer or indicator 11 at an angle to the plane of rotation of the armature or coil 10 and from the motion thereof, which in the present embodiment is at right angles to the plane of rotation of the coil, and to effect such rotation with a minimum of friction losses, the following described coupling is provided.

Fixed to the lower face of a right angle arm 43 on the free outer end of the pointer or contact arm 42 is a small permanent magnet 44 which is associated with a similar magnet 47 carried by the indicator 11, the two magnets being of opposite poles. The magnet 47 is fixed to a short arm 48 of the pivotal indicator or pointer 11 which carries adjustable pivot points 49 journalled, at right angles to the plane of rotation of the coil 10, in jewel bearings (not shown) mounted in spaced arms of a yoke member 50 secured to the terminal or contact support 21. At its free lower end, as shown in the drawing, the indicator 11 is associated with an arcuately arranged calibrated scale 51 suitably supported in relation thereto. The deflection of the coil 10 about its pivot points, which will occur when a suitable circuit is closed therethrough, will be proportional to the current therein. Thus, the magnet 44 on the contact arm 42 carried by the coil 10 and the magnet 47 on the indicator 11 provide a magnetic coupling whereby the movement of the coil is transmitted to the indicator with a minimum of friction and in such a ratio as may be accurately and readily read on the scale 51.

It will be understood that the embodiment herein described is merely illustrative of the invention and that modifications can be made and it is capable of other applications.

What is claimed is:

1. An electric measuring instrument comprising permanent magnets, a rotatably mounted coil surrounding said magnets, an arm carried by said coil, a magnet on said arm and separated from its center of rotation, an indicator, a pivotal mounting for said indicator for supporting said indicator for movement in a plane at an angle to the plane of movement of said arm, and a magnet carried by said indicator in spaced operative relation with the magnet on said arm to cause movement of said indicator in response to movement of said arm.

2. An electric measuring instrument comprising permanent magnets, a rotatably mounted coil surrounding said magnets, an arm carried by and extending from said coil in its plane of rotation, means for limiting the movement of said arm in either direction, a magnet on said arm and separated from its center of rotation, an indicator, a pivotal mounting for said indicator for supporting said indicator for movement in a plane at an angle to the plane of movement of said arm, and a magnet carried by said indicator in spaced operative relation with the magnet on said arm to cause movement of said indicator in response to movement of said arm.

3. An electric measuring instrument comprising permanent magnets, a rotatably mounted coil surrounding said magnets, an arm extending from said coil at right angles to the axis of rotation of said coil, a magnet carried by said arm and separated from its center of rotation, an indicator, a pivotal mounting for said indicator for supporting said indicator for movement in a plane at right angles to the plane of movement of said arm, and a magnet mounted upon the inner end of said indicator in spaced operative relation with the magnet on said arm to cause movement of said indicator in response to movement of said arm.

4. An electric measuring instrument comprising permanent magnets, a rotatably mounted coil surrounding said magnets, an arm extending from said coil at right angles to the axis of rotation of said coil, means for limiting the movement of said arm in either direction, a permanent magnet carried by said arm, an indicator, a pivotal mounting for said indicator for supporting said indicator at a point adjacent its inner end for movement in a plane at right angles to the plane of movement of said arm, and a permanent magnet mounted upon the inner end of said indicator in spaced operative relation with the magnet on said arm to cause movement of said indicator in response to movement of said arm, said magnets having opposite adjacent poles.

5. An electric measuring instrument comprising permanent magnets, a rotatably mounted coil surrounding said magnets, means for translating the rotary movement of said coil in one plane to the rotary movement in another plane comprising an arm fixed to and extending from said coil for movement in the plane of rotation thereof, a pivotal indicator arm arranged for movement in another plane, and magnets mounted on said arms at a point of their closest proximity for moving the indicator arm in response to movement of said first arm.

THEODORE J. PETHES, Jr.